United States Patent
Ando et al.

(10) Patent No.: US 9,984,452 B2
(45) Date of Patent: May 29, 2018

(54) MONITORING APPARATUS FOR MACHINE TOOL

(71) Applicant: Okuma Corporation, Niwa-Gun (JP)

(72) Inventors: Tomoharu Ando, Niwa-Gun (JP); Takaaki Tanaka, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 0 days. days.

(21) Appl. No.: 15/283,562

(22) Filed: Oct. 3, 2016

(65) Prior Publication Data

US 2017/0124697 A1    May 4, 2017

(30) Foreign Application Priority Data

Oct. 30, 2015 (JP) ................................. 2015-214559

(51) Int. Cl.
| | |
|---|---|
| *G06K 9/00* | (2006.01) |
| *G06T 7/00* | (2017.01) |
| *G06K 9/62* | (2006.01) |
| *G06T 7/60* | (2017.01) |
| *G01L 1/00* | (2006.01) |

(52) U.S. Cl.
CPC .............. *G06T 7/0004* (2013.01); *G01L 1/00* (2013.01); *G06K 9/00536* (2013.01); *G06K 9/6267* (2013.01); *G06T 7/60* (2013.01); *G06T 2207/30164* (2013.01)

(58) Field of Classification Search
CPC ......... B29C 2945/76943; B29C 45/768; G06F 11/0751; G06T 2207/30164
USPC ....... 382/141, 143, 145, 149, 152, 209, 218; 348/86, 125, 129
See application file for complete search history.

(56) References Cited

U.S. PATENT DOCUMENTS

| | | | | |
|---|---|---|---|---|
| 7,050,875 B2 * | 5/2006 | Cribbs | ............... | G05B 23/0229 700/108 |
| 7,290,164 B1 * | 10/2007 | Harvey | ............... | H04L 41/0654 714/2 |
| 7,308,385 B2 * | 12/2007 | Wegerich | ........... | G05B 23/0254 700/108 |

(Continued)

FOREIGN PATENT DOCUMENTS

| | | |
|---|---|---|
| JP | 01-216747 A1 | 8/1989 |
| JP | 02-100857 A1 | 4/1990 |
| JP | 2007-249484 A1 | 9/2007 |

*Primary Examiner* — Yosef Kassa
(74) *Attorney, Agent, or Firm* — Burr & Brown, PLLC (57) ABSTRACT

In an NC device having a function as a monitoring apparatus for a machine tool, a monitoring parameter and a retracting parameter which are set and inputted through an input unit by an operator, can be stored in a storage unit. When, for example, monitoring is performed by using a load on a main spindle as machine information, a machining monitoring unit displays a monitored state on a monitor, and compares a threshold value, of the load on the main spindle, according to which occurrence of abnormality is determined, and which is set in the monitoring parameter, and an instruction load generated by a machine operation instruction unit with each other, to determine whether or not abnormality has occurred. When abnormality is determined as having occurred, a retracting instruction is transmitted to a retracting instruction unit according to the retracting parameter, and display is performed on the monitor.

5 Claims, 7 Drawing Sheets

(56) References Cited

U.S. PATENT DOCUMENTS

| | | | | |
|---|---|---|---|---|
| 7,539,597 | B2* | 5/2009 | Wegerich | G05B 23/0254 |
| | | | | 700/108 |
| 8,214,101 | B2* | 7/2012 | Carlton | G01M 15/042 |
| | | | | 340/438 |
| 8,314,576 | B2* | 11/2012 | Fahimi | H02P 23/14 |
| | | | | 318/400.04 |
| 8,607,093 | B2* | 12/2013 | DeHaan | G06F 11/0709 |
| | | | | 702/39 |
| 8,749,927 | B2* | 6/2014 | Beifus | G05B 23/0264 |
| | | | | 318/400.12 |
| 8,884,775 | B2* | 11/2014 | Komamura | B29C 45/76 |
| | | | | 340/679 |
| 9,071,110 | B2* | 6/2015 | Lalonge | H02K 11/20 |

\* cited by examiner

FIG.7

MONITORING APPARATUS FOR MACHINE TOOL

BACKGROUND OF THE INVENTION

This application claims the benefit of Japanese Patent Application Number 2015-214559 filed on Oct. 30, 2015 the entirety of which is incorporated by reference.

FIELD OF THE INVENTION

The present invention relates to a monitoring apparatus that determines a machined state and abnormality of a machine tool which machines a workpiece while rotating a tool or the workpiece.

DESCRIPTION OF THE BACKGROUND ART

In a machine tool that rotates a workpiece or a tool attached to a main spindle and moves the tool and the workpiece relatively to perform machining, damage to the tool may cause a machining failure, that, for example, the workpiece cannot be machined in desired size and shape. In addition, if a feed shaft continues to be operated in a state where the workpiece cannot be removed due to damage to the tool, the tool is likely to collide with the workpiece, damaging the machine tool as well as the tool and the workpiece. Therefore, in general, for example, a load, on a main spindle motor, which is considered to best represent a state of the machining, is monitored, and the feed shaft is stopped.

Figure 1:
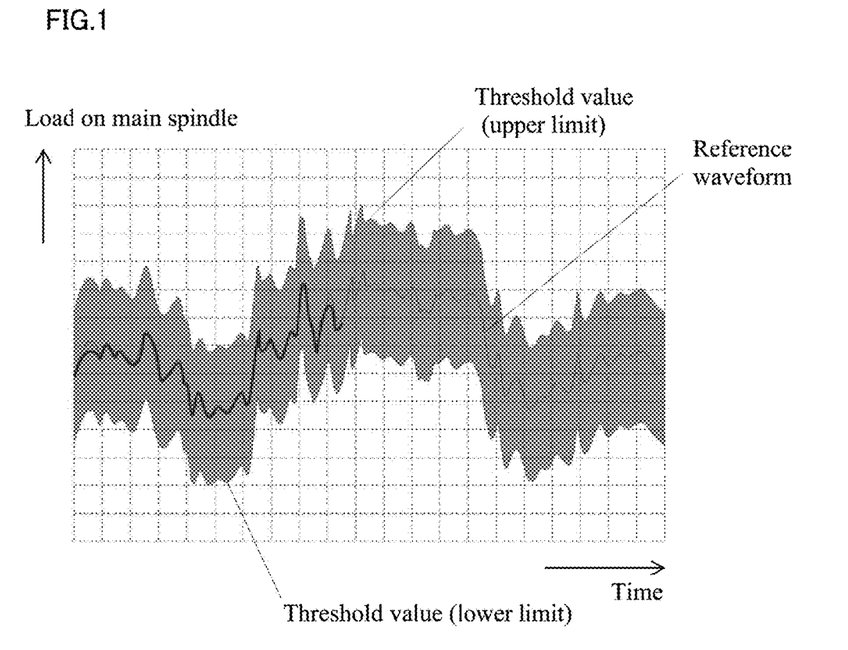
FIG. 1 illustrates an example where threshold values are set by offset of a reference waveform.

For example, in monitoring in which a load on a main spindle motor is utilized, there has been known the following method. In the method, a load on a main spindle, which is obtained when machining has been normally performed, is set as a reference value, and comparison of an actually detected load with the reference value is performed at predetermined time intervals, to monitor the actually detected load. FIG. 1 illustrates a load during an actual normal machining that is recorded as a reference value, and threshold values for alarming that are offset from the reference value in the vertical direction. Displaying of the threshold values and monitored signals is very effective in order to grasp a state in monitoring.

Further, as such a display technique, Japanese Laid-Open Patent Publication No. H02-100857 (hereinafter, referred to as Patent Literature 1) discloses a technique in which a load monitoring apparatus renders, on a display section, comparison between a reference value and data of a load detected in machining. Thus, a state of the monitoring apparatus can be visually grasped.

Further, Japanese Laid-Open Patent Publication No. H01-216747 (hereinafter, referred to as Patent Literature 2) discloses another display technique. Patent Literature 2 discloses a technique in which AE is represented on the vertical axis and time is represented on the horizontal axis, and the vertical scale is automatically adjusted, considering that, if an AE sensor is used to detect for abnormal machining, difference between a sensor signal in normal machining and a signal obtained in occurrence of abnormality is larger, and a signal in abnormal machining cannot be seen with a scale for normal machining. Thus, both a signal in normal machining and a signal in abnormal machining can be displayed so as to be easily seen at the same time.

Meanwhile, when abnormality is detected in these machining monitoring techniques, retracting (separating a tool and a workpiece from each other) may be performed in order to minimize damage to a workpiece. As the retracting, the device disclosed in Japanese Laid-Open Patent Publication No. 2007-249484 (hereinafter, referred to as Patent Literature 3) is known. In the device, when abnormality occurs, an offset vector Vof for tool diameter correction in a block during machining is read, and the offset vector Vof for the tool diameter correction is used to retract the tool in a direction normal to the machined surface of the workpiece. Therefore, the tool and the workpiece can be retracted from each other so as not to interfere with each other.

SUMMARY OF THE INVENTION

In the monitoring for machining in which a load on a main spindle is used, the load is momentarily increased even in a non-machining state when the main spindle starts rotating. Therefore, the monitoring needs to be prevented from being performed when the main spindle starts rotating. However, in the techniques disclosed in Patent Literatures 1 and 2, an operator cannot be notified of such a state monitored by the monitoring apparatus. Therefore, an operator cannot grasp why abnormality is not detected in a state where a value of the load exceeds the threshold value.

Meanwhile, in a case where, as described in Patent Literature 3, retracting is performed when abnormality occurs, the operator desires to grasp the direction, the distance, and the speed of the movement of the main spindle when the monitoring apparatus determines that abnormality has occurred.

Therefore, an object of the present invention is to provide a monitoring apparatus, for a machine tool, which allows a monitored state of machine information including occurrence of abnormality to be easily grasped.

In order to attain the above object, a first aspect of the present invention is a monitoring apparatus for a machine tool. The monitoring apparatus includes a determination unit and a display control unit. The determination unit monitors machine information of the machine tool and determines whether or not abnormality occurs. The display control unit displays, on a display unit, a monitored state of the machine information, and a countermeasure state in the case of occurrence of abnormality having been determined by the determination unit.

According to a second aspect of the present invention based on the first aspect, the display control unit displays, on the display unit, the monitored state of the machine information by using a time axis, and also displays, on the display unit, a period in which no monitoring is performed and/or a period in which monitoring has not been performed.

In a third aspect of the present invention based on the second aspect, the determination unit compares a value of the machine information with a predetermined threshold value for the machine information, and determines whether or not abnormality occurs.

The display control unit displays the threshold value on the display unit, and displays, on the display unit, the period in which no monitoring is performed and/or the period in which the monitoring has not been performed. These periods are displayed on a line indicating the threshold value in different display modes.

In a fourth aspect of the present invention based on the third aspect, the display control unit displays, on the display unit, a value of the machine information, and time that elapses in the case of the value exceeding the threshold value.

In a fifth aspect of the present invention based on the first aspect, a retracting instruction unit is provided to make an instruction for separating a tool and a workpiece when the determination unit determines that abnormality has occurred, and the display control unit displays, on the display unit, a retracting direction and distance instructed by the retracting instruction unit, as the countermeasure state.

According to the first aspect of the present invention, a monitored state of machine information, and a countermeasure state in the case of abnormality having occurred can be known through the display unit. Thus, the actual machining and the monitored state are simultaneously confirmed, and therefore, for example, it can be determined whether or not the monitoring is set for the machined portion as initially estimated, and whether or not the threshold value thereof is proper. Further, an operation to be performed can be grasped when it is determined that abnormality has occurred. As a result, in normal machining, the operation to be performed when it is determined that abnormality has occurred at each machined portion can be confirmed in advance.

According to the second aspect of the present invention, in addition to the effect of the first aspect, the following effect can be obtained. That is, for example, even in a case where a person who performs setting for the monitoring apparatus is different from an operator, it can be grasped whether the monitoring is not performed according to the setting, or the monitoring is not performed since a condition of the monitoring apparatus is not satisfied.

According to the third aspect of the present invention, in addition to the effect of the second aspect, the following effect can be obtained. That is, whether or not the monitoring is performed is indicated on a line indicating the threshold value, thereby allowing more intuitive grasping.

According to the fourth aspect of the present invention, in addition to the effect of the third aspect, the following effect is obtained. That is, in a case where deviation from the threshold value is confirmed, a time period until start of an operation performed by the machine tool at occurrence of abnormality can be grasped. Thus, when it is estimated that a time period until start of the operation performed at occurrence of abnormality is long, an operator him/herself can stop the machine tool.

According to the fifth aspect of the present invention, in addition to the effect of the first aspect, the following effect is obtained. That is, in a state where retracting is set, a direction and a distance are displayed in a case where occurrence of abnormality is determined and a retracting operation is performed. Since confirmation is allowed to be performed while the machining is being watched, it can be determined in advance that, for example, retracting in the retracting direction may cause collision in the case of abnormality.

DESCRIPTION OF THE PREFERRED EMBODIMENTS

Hereinafter, an embodiment of the present invention will be described with reference to the drawings.

Figure 2:
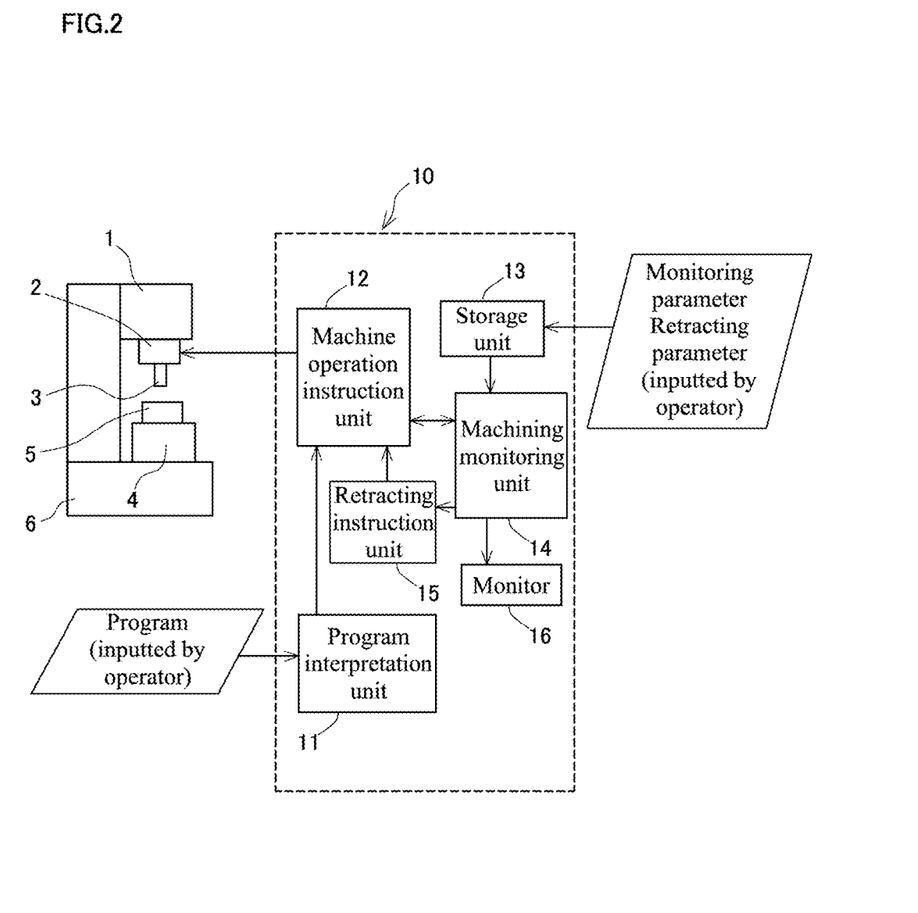
FIG. 2 is a block diagram illustrating a structure of a machine tool.

FIG. 2 is a block diagram illustrating an example of a structure of a machine tool. The machine tool has a main spindle housing 1, and the main spindle housing 1 has a main spindle 2 that is rotatable by means of a main spindle motor. A tool 3 is attached to an end of the main spindle 2. A workpiece 5 is fixed on a table 4, and the table 4 is moved on a bed 6 in an X axis, a Y axis, and a Z axis directions orthogonal to each other so as to move the tool 3 and the workpiece 5 relative to each other, whereby the workpiece 5 is machined.

Reference numeral 10 denotes an NC device that controls the machine tool. The NC device 10 includes a program interpretation unit 11 and a machine operation instruction unit 12. The program interpretation unit 11 interprets, a program that is inputted by an operator through not-illustrated an input unit, into a main spindle rotation instruction and a feed shaft operation instruction. The machine operation instruction unit 12 controls the main spindle motor and each feed shaft on the basis of the instructions transmitted from the program interpretation unit 11. The NC device 10 machines the workpiece 5 and also has a function as a monitoring apparatus of the present invention.

In the NC device 10, a monitoring parameter (for example, a threshold value, and time, after the threshold value is exceeded, at which abnormality is to be determined to have occurred) and a retracting parameter (a direction, a distance, a speed, or the like of the retracting), which are set and inputted through the input unit by an operator, can be stored in a storage unit 13.

Reference numeral 14 denotes a machining monitoring unit that performs monitoring for machining with the use of the monitoring parameter stored in the storage unit 13. The machining monitoring unit 14 compares the threshold value of a load on the main spindle and an instruction load generated by the machine operation instruction unit 12 with each other when, for example, monitoring is performed by using the load on the main spindle as machine information. According to the threshold value of the load on the main spindle, occurrence of abnormality is determined, and the threshold value of the load on the main spindle is set in the monitoring parameter. When the machining monitoring unit 14 determines that abnormality has occurred, a retracting instruction is transmitted to a retracting instruction unit 15, according to the retracting parameter. The retracting instruction unit 15 issues an instruction for operating the machine tool to the machine operation instruction unit 12. Further, the machining monitoring unit 14 displays a monitored state and a retracting state on a monitor 16 (a display unit). The machining monitoring unit 14 includes a determination unit and a display control unit of the present invention.

Figure 3:
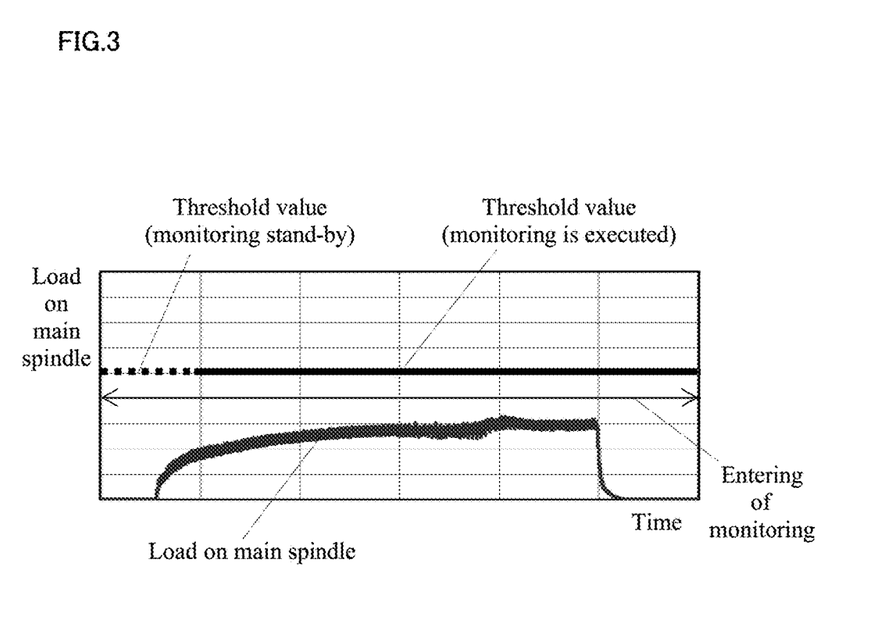
FIG. 3 illustrates an example where both a threshold value and a load on a main spindle are simultaneously displayed on a monitor.
Figure 4:
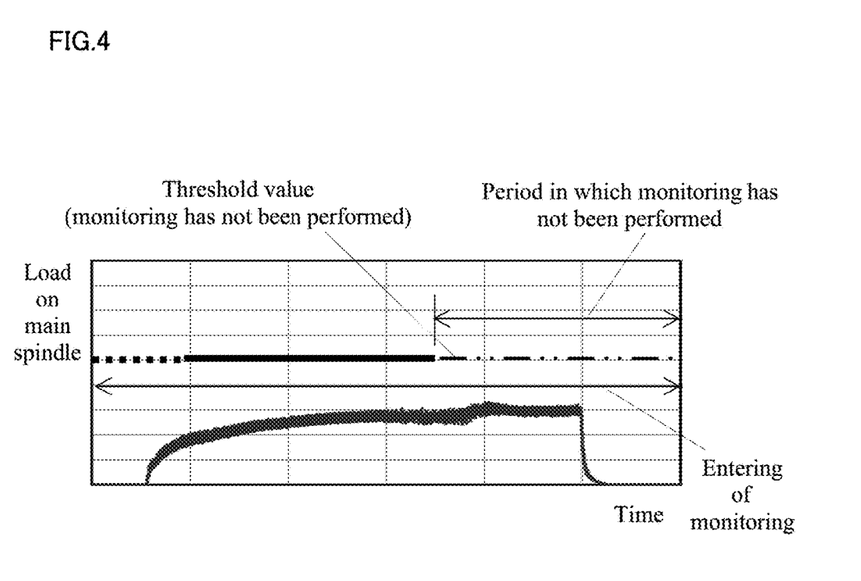
FIG. 4 illustrates an example where a period in which no monitoring is performed and a period in which monitoring has not been performed are displayed by a solid line and a two-dot chain line, respectively, on a line indicating the threshold value.

Contents displayed on the monitor 16 will be described. On the monitor 16, the threshold value for monitoring is displayed as shown in FIG. 3. As shown in FIG. 3, a range of entering of monitoring is represented in a range of a line indicating the threshold value. However, as described above, when monitoring is performed on the basis of the load on the main spindle, the load may be rapidly increased when the main spindle starts rotating in some cases. Therefore, a time period (monitoring stand-by), which is to elapse after entering of monitoring until actual start of the monitoring, is set. The dashed line shown in FIG. 3 represents the monitoring stand-by time. A period in which the monitoring has been thereafter performed is displayed as a solid line of the threshold value. When the monitoring has become inactive for some reason, the period is displayed as a two-dot chain line on the line indicating the threshold value as shown in FIG. 4.

Figure 5:
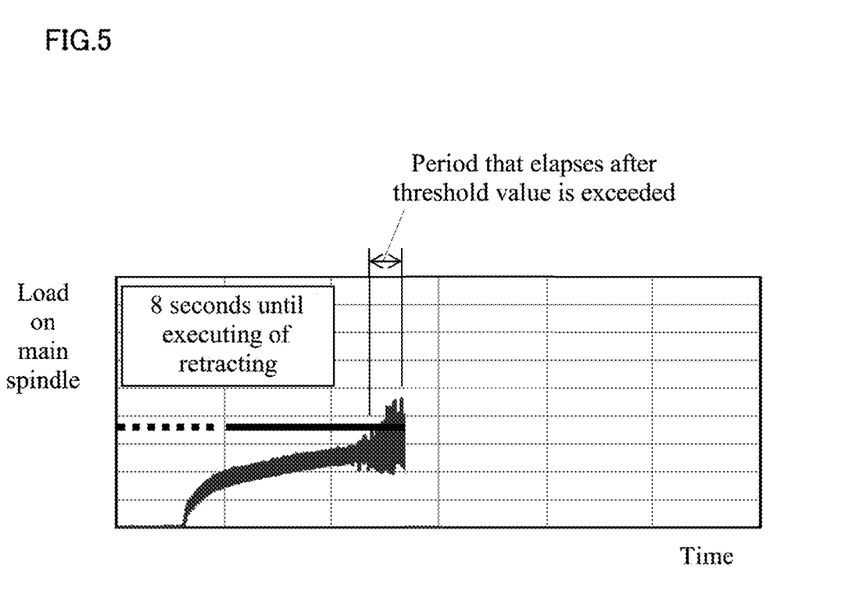
FIG. 5 illustrates an example where elapse of time in the case of a load on the main spindle exceeding the threshold value is displayed.
Figure 6:
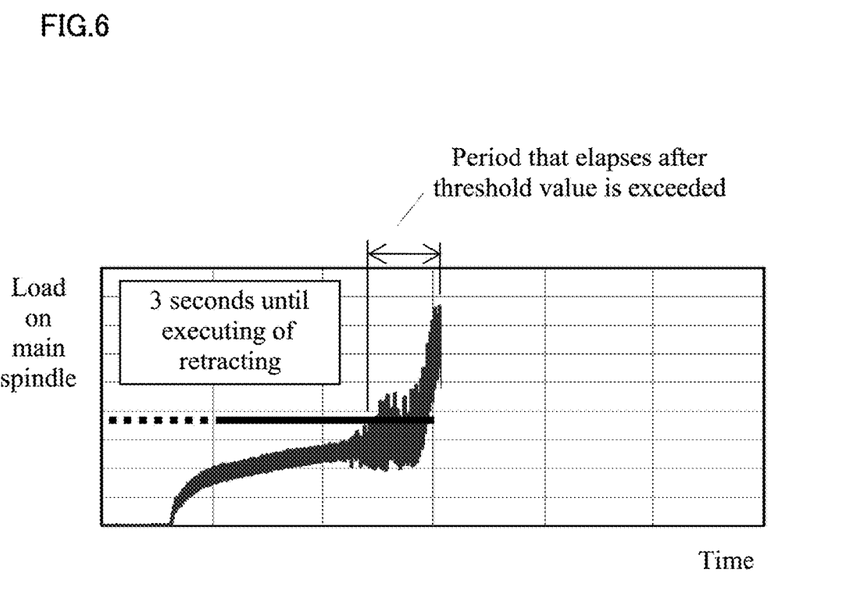
FIG. 6 illustrates an example where elapse of time in the case of a load on the main spindle exceeding the threshold value is displayed.

In the monitoring parameter, time that is to elapse after the load on the main spindle exceeds the threshold value until it is determined that abnormality has occurred, is set. FIGS. 5 and 6 illustrate examples where time that elapses after the threshold value is exceeded until it is determined that abnormality has occurred and retracting is executed, is displayed on the monitor 16. In FIGS. 5 and 6, time up to the execution of the retracting is counted down. As shown in FIG. 5 to FIG. 6, as time elapses, a temporal waveform of the load on the main spindle is elongated, and, according thereto, time to be counted down to zero is shortened.

Figure 7:
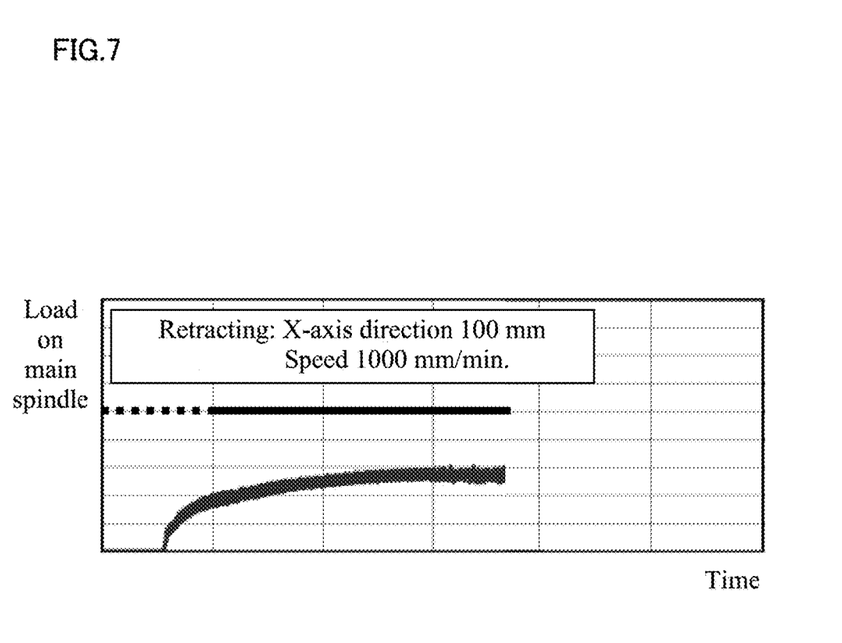
FIG. 7 illustrates an example where a retracting direction and distance, and speed in the case of a retracting instruction being made, are displayed.

FIG. 7 illustrates an example where a retracting state is displayed as a countermeasure state on the monitor 16. The retracting direction and distance, and the moving speed are displayed. Thus, a movement of retracting in the case of the threshold value being exceeded can be grasped.

Thus, the NC device 10 (monitoring apparatus) having the above-described configuration includes the machining monitoring unit 14 that serves as the determination unit and the display control unit. The determination unit monitors the load on the main spindle for the machine tool to determine whether or not abnormality has occurred. The display control unit displays, on the monitor 16, the monitored state of the load on the main spindle and the countermeasure state in the case of abnormality having occurred. Therefore, the monitored state of the load on the main spindle and the countermeasure state in the case of abnormality having occurred can be known through the monitor 16. Thus, the actual machining and the monitored state are simultaneously confirmed, whereby, for example, it can be determined whether or not the monitoring is set for the machined portion as initially estimated, and whether or not the threshold value thereof is proper. Further, an operation to be performed can be grasped when it is determined that abnormality has occurred, so that, in normal machining, the operation to be performed when it is determined that abnormality has occurred at each machined portion can be confirmed in advance.

In particular, in the description herein, the machining monitoring unit 14 displays, on the monitor 16, the monitored state of the load on the main spindle by using a time axis, and also displays, on the monitor 16, the period in which no monitoring is performed, and the period in which the monitoring has not been performed. Therefore, for example, also in a case where a person who performs setting for the monitoring apparatus is different from an operator, it can be grasped whether the monitoring is not performed according to the setting, or the monitoring is not performed since a condition of the monitoring apparatus is not satisfied.

Further, the machining monitoring unit 14 compares between a value of the load on the main spindle and the threshold value that is preset for the load on the main spindle, and determines whether or not abnormality has occurred. The monitor 16 displays the threshold value, and displays the period in which no monitoring is performed and the period in which the monitoring has not been performed, on the line indicating the threshold value, in different display modes (in the description herein, the different kinds of the lines), thereby allowing more intuitive grasping.

Further, the value of the load on the main spindle, and time that elapses in the case of the value having exceeded the threshold value are displayed on the monitor 16. Thus, in a case where deviation from the threshold value is confirmed, the time period until start of an operation performed by the machine tool when abnormality has occurred, can be grasped. Thus, when it is estimated that the time period until start of the operation performed at occurrence of abnormality is long, an operator him/herself can stop the machine tool.

The retracting instruction unit 15 is provided to make an instruction for separating the tool 3 and the workpiece 5 from each other when the machining monitoring unit 14 determines that abnormality has occurred. The machining monitoring unit 14 displays, on the monitor 16, a retracting direction and distance, and a retracting speed instructed by the retracting instruction unit 15, whereby confirmation is allowed to be performed while the machining is watched in the countermeasure state in which retracting is set. Thus, it can be determined in advance that, for example, retracting in this direction may cause collision in the case of abnormality.

FIGS. 3 to 7 illustrate examples where the threshold value is constant. However, as shown in FIG. 1, the threshold value may be based on a time-series waveform. Further, although the monitored state is represented according to kinds of lines for the threshold value, the monitored state may be represented according to colors for the threshold value. Display may show the period (for example, a range is enclosed by a quadrangular shape) instead of the threshold value.

Further, FIGS. 5 and 6 illustrate examples where time that elapses since the threshold value is exceeded, is represented as a numerical value obtained by counting down. However, elapse of the time may be represented by a bar graph. A relationship between the threshold value and a value of the machine information which is monitored may be displayed as a numerical value, which is not shown in FIGS. 5 and 6.

Meanwhile, in FIG. 7, a retracting speed is also displayed as the parameter for retracting. However, only the retracting direction and distance may be displayed. The retracting direction and distance may be illustrated as a vector and a length thereof instead of numerical values. Further, the remaining distance up to the retracting position may be displayed during retracting. Further, the countermeasure state may include not only a retracting state but also a state where the position of the tool remains unchanged while the tool is being rotated.

Meanwhile, in the above embodiment, the monitoring apparatus is implemented by the NC device, and the display unit is used also as a display screen for the NC device. However, at least the determination unit and the display control unit, and the display unit may be separate from the NC device, to implement the monitoring apparatus by an external device (for example, a personal computer) that has wired connection or wireless connection to the NC device, and the machine information such as a load on the main spindle may be monitored by the monitoring apparatus. Thus, the machine information of a plurality of machine tools can be simultaneously monitored by the monitoring apparatus disposed at one position.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. A monitoring apparatus for a machine tool, the monitoring apparatus comprising:
 a determination unit for monitoring machine information of the machine tool and determining whether or not abnormality occurs; and
 a display control unit for displaying, on a display unit;
  a monitored state of the machine information,
  a countermeasure state in the case of occurrence of abnormality having been determined by the determination unit,
  a monitored state of the machine information by using a time axis, and
  at least one of a period in which no monitoring is performed and a period in which monitoring has not been performed.

2. The monitoring apparatus for the machine tool according to claim 1, wherein
 the determination unit compares between a value of the machine information and a predetermined threshold value for the machine information, and determines whether or not abnormality occurs, and
 the display control unit displays the threshold value on the display unit, and displays, on the display unit, at least one of the period in which no monitoring is performed and the period in which the monitoring has not been performed, on a line indicating the threshold value, in different display modes.

3. The monitoring apparatus for the machine tool according to claim 2, wherein the display control unit displays, on the display unit, a value of the machine information, and time that elapses in the case of the value exceeding the threshold value.

4. The monitoring apparatus for the machine tool according to claim 1, comprising a retracting instruction unit for making an instruction for separating a tool and a workpiece when the determination unit determines that abnormality has occurred, wherein
 the display control unit displays, on the display unit, a retracting direction and distance designated in the instruction made by the retracting instruction unit, as the countermeasure state.

5. A monitoring apparatus for a machine tool, the monitoring apparatus comprising:
 a determination unit for monitoring machine information of the machine tool and determining whether or not abnormality occurs;
 a retracting instruction unit for making an instruction for separating a tool and a workpiece when the determination unit determines that abnormality has occurred; and
 a display control unit for displaying, on a display unit:
  a monitored state of the machine information,
  a countermeasure state in the case of occurrence of abnormality having been determined by the determination unit; and
  a retracting direction and distance designated in the instruction made by the retracting instruction unit, as the countermeasure state.

* * * * *